(No Model.)

C. A. CONGER.
COMBINED LISTING PLOW AND SEEDER.

No. 364,484. Patented June 7, 1887.

Witnesses

Inventor
C. A. Conger

By his Attorney
W. O. Crosby

UNITED STATES PATENT OFFICE.

CHARLES A. CONGER, OF SEYMOUR, IOWA.

COMBINED LISTING-PLOW AND SEEDER.

SPECIFICATION forming part of Letters Patent No. 364,484, dated June 7, 1887.

Application filed March 24, 1887. Serial No. 232,303. (No model.)

*To all whom it may concern:*

Be it known that I, CHARLES A. CONGER, a citizen of the United States, residing at Seymour, in the county of Wayne and State of Iowa, have invented certain new and useful Improvements in a Combined Listing-Plow and Seeder; and I do hereby declare the following to be a full, clear, and exact description of the invention, such as will enable others skilled in the art to which it appertains to make and use the same.

My invention relates to a combined listing-plow and planter, and has for its object the production of a machine constructed so as to break the ground and plant corn or other grain by the same operation.

With many of the implements now in use, especially by corn-producers, it sometimes requires weeks to prepare the ground for planting. Then, too, protracted rains often set in, thus delaying operations until the season is too far advanced to mature a good crop; but by the use of my combined breaker and planter these disadvantages are largely overcome, as the farmer can go into the field at the proper season, break the ground and plant by the same operation and at the same time.

The invention will be hereinafter described, and particularly pointed out in the claims.

Figure 1:
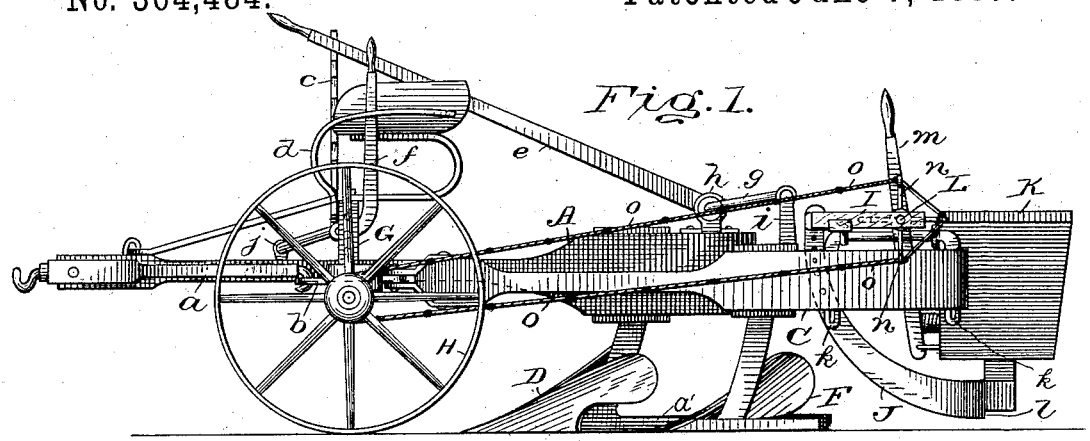
Figure 2:
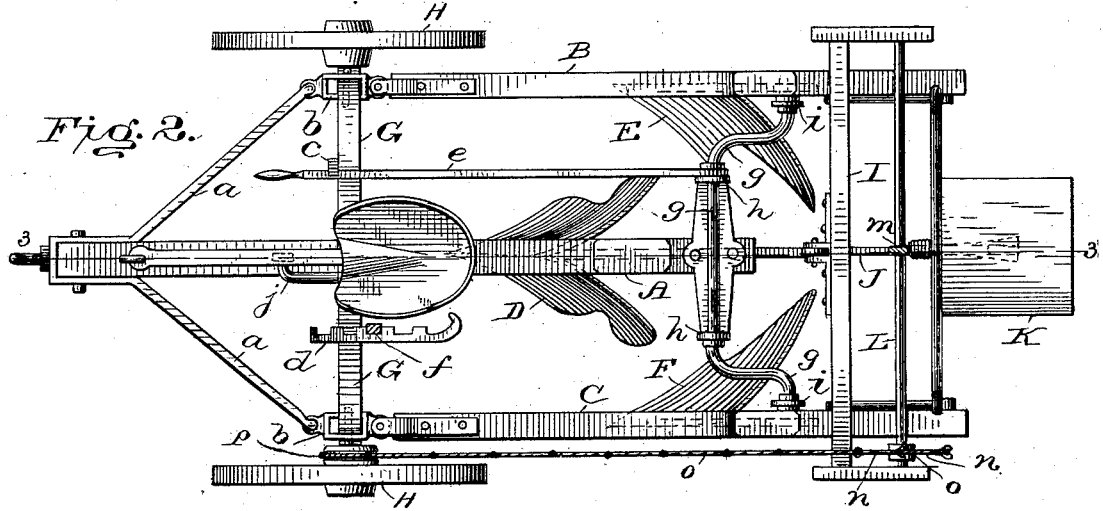
Figure 3:
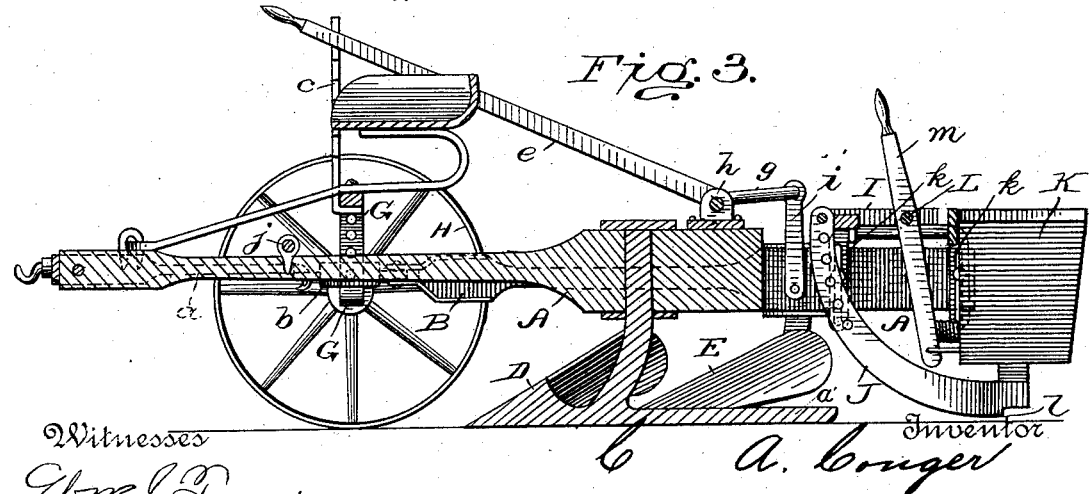

In the accompanying drawings, which form a part of this specification, Figure 1 represents a side elevation of my invention; Fig. 2, a plan view of the same, and Fig. 3 a vertical longitudinal section on line 3 3 of Fig. 2.

Reference being had to the drawings and the letters marked thereon, A, B, and C represent plow-beams, to the under side of which are secured plows D, E, and F, respectively. The plow D is a double-mold-board plow, having a bar, $a'$, in its rear to carry the weight of side plows, E F, and the seeder when turning.

G is the crank-axle, and H the wheels.

To the front end of beam A are pivotally secured continuous hounds $a\ a$, the rear ends of which are fastened to axle G through the medium of couplings $b\ b$, which are vertically adjustable thereon. To the opposite side of the couplings $b\ b$ are pivotally attached the front ends of beams B and C, thus allowing a vertical and a slightly-lateral movement of the hounds, the beams, and their plows. On the axle G are rigidly secured racks $c\ d$, with which engage levers $e\ f$ for raising and lowering the plows. The lever $e$ is attached to rock-shaft $g$, journaled at $h\ h$ on the rear end of the beam A, and connected with beams B and C by links $i\ i$. The angular lever $f$ is fulcrumed on the under side of axle G, and connected with beam A in front of the axle at $j$.

The seeding device, located on the rear of the machine, consists of a frame, I, joined to the rear end of beams B C by slotted connections $k\ k\ k\ k$, thus allowing a vertical adjustment regulating the depth to which the seed is planted; a furrow-opening blade, J, having cutting-edge $l$, attached to frame I, punctured to allow of further adjustment as to depth, and gradually widening at its rear end, so as to open the row for the reception of seed; seed-box K, provided with an outlet-tube or seed-drill leading into the furrow between the bifurcated end of blade J, to which it is rigidly attached; a shaft, L, having secured in its center a lever, $m$, controlling the slide in the bottom of the seed-box, and having on its end forked arms $n$ for automatically reciprocating the seed, and thereby regulating the flow of seed through the medium of a knotted rope, $o$, acting in the forked arm $n$ and over pulley $p$, secured to one of the wheels H. The lever $m$ is returned to its normal position—that is, over the seed-outlet—by means of a spring attached to the lever and to a fixed portion of the structure.

The construction being substantially as described, the operation is as follows: The plows D E F having been adjusted according to the depth of ground desired to break by raising or lowering levers $e\ f$, and the blade J adjusted, through the medium of brackets $k$, according to the depth desired to plant, the machine is given a forward motion, the listing-plow D cuts a furrow, and having a double mold-board the earth is thrown to either side, where it is caught by the mold-board of plows E F, and, together with the earth cut from their furrows, thrown back into the furrow first cut by the lister and piled in an inverted-V-shaped row, which is cut through its center by the advancing blade J, and the valve in the bottom of the seed-box having been opened by the hand of the operator, or by the engagement of one of the knots in rope *o* with the forked arms *n*, the seed is deposited at regular intervals in the corn or seed row, and the loose earth falls in, completely covering it.

It is obvious that by my improved breaker and planter the arrangement of the plows brings the soil together, increasing its depth and consequently its productiveness. The corn row or ground is left ridging, so that in case of cold rains or wet weather the seed is protected and will be much more likely to grow than if planted in a furrow, or even in level ground.

Having thus described my invention, what I claim is—

1. In a combined listing-plow and planter, a beam supporting a listing-plow, beams pivotally connected to the axle and supporting side plows, and suitable means for raising the listing-plow and the side plows separately, substantially as described.

2. The combination of a listing-plow adjusted from the axle, and beams supporting side plows adjustably secured to the axle at their front ends and raised and lowered at their rear ends from the beam of the listing-plow, substantially as described.

3. The combination of a crank-axle, a listing-plow beam adjusted therefrom, hounds and side-plow beams adjustably secured to the axle, and suitable levers for raising and lowering the several plow-beams, substantially as described.

4. In a combined listing-plow and planter, an axle provided with suitable wheels, a listing-plow provided with a rearwardly-projecting horizontal bar, and a rock-shaft and lever secured to the axle and to the listing-plow beam in front of the axle, substantially as described.

5. In a combined listing-plow and planter, a double-mold-board listing-plow, two single-mold-board side plows on separate adjustable beams, an adjustable seed-drill in the rear of and between the side plows, and a blade in front of the drill for separating the soil to receive the seed, substantially as described.

6. In a combined listing-plow and planter, a seeding device adjustably supported upon the rear end of the side-plow beams and provided with suitable means for mechanical or automatic dropping of seed, substantially as described.

In testimony whereof I affix my signature in presence of two witnesses.

CHARLES A. CONGER.

Witnesses:
 N. C. MICHAEL,
 K. P. MORRISON.